US012521746B2

(12) United States Patent
Yang

(10) Patent No.: US 12,521,746 B2
(45) Date of Patent: Jan. 13, 2026

(54) CONTROL SWITCH AND REGULATING MECHANISM FOR ATOMIZER

(71) Applicant: ZHEJIANG PRULDE ELECTRIC APPLIANCE CO., LTD., Jinhua (CN)

(72) Inventor: Weiming Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 473 days.

(21) Appl. No.: 18/682,447

(22) PCT Filed: Nov. 17, 2020

(86) PCT No.: PCT/CN2020/129315
§ 371 (c)(1),
(2) Date: Feb. 9, 2024

(87) PCT Pub. No.: WO2022/041504
PCT Pub. Date: Mar. 3, 2022

(65) Prior Publication Data

US 2024/0226942 A1 Jul. 11, 2024

(30) Foreign Application Priority Data

Aug. 27, 2020 (CN) ......................... 202010878520.8
Aug. 27, 2020 (CN) ......................... 202021831352.9

(51) Int. Cl.
*B05B 12/08* (2006.01)
*B05B 11/06* (2006.01)

(52) U.S. Cl.
CPC .............. *B05B 12/08* (2013.01); *B05B 11/06* (2013.01)

(58) Field of Classification Search
CPC ........... B05B 12/08; B05B 11/06; A01M 7/00
See application file for complete search history.

(56) References Cited

U.S. PATENT DOCUMENTS 4,508,276 A * 4/1985 Malcolm ................ B05B 5/053 239/707
10,351,335 B1 7/2019 Alonso et al.
2011/0277686 A1* 11/2011 Walter .................. B05B 5/1608 141/2

FOREIGN PATENT DOCUMENTS

| | | | |
|---|---|---|---|
| CN | 203803682 | U | 9/2014 |
| CN | 207013187 | U | 2/2018 |
| CN | 107755165 | A | 3/2018 |
| KR | 100739880 | B1 | 7/2007 |
| WO | 2020114577 | A1 | 6/2020 |

* cited by examiner

*Primary Examiner* — Qingzhang Zhou
(74) *Attorney, Agent, or Firm* — Bayramoglu Law Offices LLC

(57) ABSTRACT

A control switch and regulating mechanism for an atomizer is provided. A push button is pushed to move towards a press button to start a fan by a fan controller, the push button drives a fixed rod on the push button to be located above a clamping groove in the press button, the press button is held to drive an end of the press button to rotate upwards around a rotating rod until the clamping groove in the press button clamps a lower end of the fixed rod, and an atomizer starts to spray water; either the push button or the press button is pressed separately, the atomizer will not spray water; and a spring can apply a force to the fixed rod to drive the fixed rod to move away from the press button until the lower end of the fixed rod is steadily clamped in the clamping groove.

10 Claims, 10 Drawing Sheets

CONTROL SWITCH AND REGULATING MECHANISM FOR ATOMIZER

CROSS REFERENCE TO THE RELATED APPLICATIONS

This application is the national phase entry of International Application No. PCT/CN2020/129315, filed on Nov. 17, 2020, which is based upon and claims priority to Chinese Patent Applications No. 202021831352.9 and No. 202010878520.8, both filed on Aug. 27, 2020, the entire contents of which are incorporated herein by reference.

TECHNICAL FIELD

The invention belongs to the technical field of atomizers, and particularly relates to a control switch and regulating mechanism for an atomizer.

BACKGROUND

A fan in an atomizer rotates to produce a pressure difference between an air outlet and the interior of a water tank, and liquid in the water tank enters the air outlet under pressure and is sprayed out in the form of mist under the action of the fan. The fan in the atomizer is started by pressing a button, and a connecting rod is driven to move to control a water outlet of an air outlet tube to be opened or closed. Generally, the length of the connecting rod is fixed, the moving distance of a plug, driven by the connecting rod, in the water outlet is fixed, a gap between the plug and the water outlet is fixed after the button is pressed, and the outlet flow rate is fixed and cannot be regulated as actually needed, causing inconvenience in use; in addition, generally, the same button is used for controlling both the fan and the water outlet, and in actual use, the atomized may be started due to mistouch of the button located below a handle when users take the atomizer, also causing inconvenience in use. So, it is necessary to make some improvements to the prior art.

SUMMARY

To overcome the defect that an atomizer may be started due to mistouch a button located below a handle when users take the atomizer, the invention provides a control switch and regulating mechanism for an atomizer to prevent mistouch.

The objective of the invention is fulfilled through the following technical solution: a control switch and regulating mechanism for an atomizer are mounted in an atomizer housing, the control switch is used for controlling a fan controller to be turned on or off, and the regulating mechanism is located between the control switch and a water outlet tube, wherein the control switch comprises a push button for controlling the fan controller to be turned on or off and a press button used for driving the regulating mechanism to move and rotatably arranged in the housing, the press button has an end located below the push button as well as an end leaning against the regulating mechanism, a fixed rod is fixedly arranged at a lower end of the push button, a clamping groove for clamping the fixed rod is formed in an upper surface of a side, away from the regulating mechanism, of the press button, and the push button is able to move towards the press button in a length direction of the push button and press the press button to allow the clamping groove in the press button to rotate to clamp the fixed rod.

Preferably, a sliding groove used for clamping the push button and allowing the push button to reciprocate in the length direction of the push button is formed in the housing, a rotating rod is fixedly arranged in the housing, and the press button is rotatably arranged on the rotating rod.

Preferably, a fixed pillar is fixedly arranged on an end face, facing the press button, of the fixed rod, the fixed pillar is sleeved with a spring for driving the push button to move away from the press button, a clamping seat used for clamping the spring and having an opening facing the fixed rod is fixedly arranged in the housing, and an end, away from the fixed pillar, of the spring is clamped in the clamping seat.

Preferably, the rotating rod is sleeved with a torsion spring for driving an end, away from the regulating mechanism, of the press button to rotate downwards around the rotating rod, a clamping pillar is fixedly arranged on the housing and located above the press button, and the torsion spring has an end clamped on the clamping pillar as well as an end fixedly arranged on the press button.

Preferably, a push block is fixedly arranged at an upper end of the push button, an upper end of the push block is located on an outer side of the housing, a moving groove for clamping the push block is formed in the housing, and the moving groove is longer than the push block.

Preferably, on and off marks are arranged on the push button, and the two marks are respectively located on two sides of a push block on the push button, located on a same line as the push block and parallel to the length direction of the push button.

Preferably, the regulating mechanism comprises a spline shaft rotatably arranged in the housing and a rotating ferrule disposed around the spline shaft and capable of moving in a length direction of the spline shaft, a guide groove matched with the spline shaft is formed in an inner wall of the rotating ferrule, a limiting plate used for restraining the rotating ferrule from moving in the length direction of the spline shaft is fixedly arranged on the housing, a rotating groove extending into the spline shaft is formed in a lower surface of the spline shaft, an ejector rod is movably arranged in the rotating groove by threaded connection, a guide plate is fixedly arranged on each of two sides of the ejector rod, clamping grooves for clamping the guide plates are fixedly arranged in the housing, the guide plates are able to move in the clamping grooves in a length direction of the ejector rod as the ejector rod moves, and an adjusting knob for controlling the rotating ferrule to rotate is arranged on the housing.

Preferably, the adjusting knob is rotatably arranged on the housing, a first gear is fixedly arranged at an end, facing the ejector rod, of the rotating ferrule, a second gear always meshed with the first gear is fixedly arranged at an end, facing the rotating ferrule, of the adjusting knob, and the adjusting knob is able to drive the rotating ferrule to rotate around a central axis of the rotating ferule by means of the first gear and the second gear matched with the first gear.

Preferably, the first gear is a bevel gear, the second gear inclines gradually towards a periphery of the adjusting knob in a direction from the adjusting knob to the rotating ferrule, and a length direction of teeth on the second gear is perpendicular to a length direction of teeth on the first gear.

Preferably, a spacing ring is fixedly arranged at the end, facing the ejector rod, of the rotating ferrule, the spacing ring is located in the first gear and disposed around the ejector rod, an inner diameter of the spacing ring is less than an outer diameter of the spline shaft, a positioning ring is fixedly arranged on the ejector rod, and a diameter of the positioning ring is greater than a diameter of the ejector rod and less than the inner diameter of the spacing ring.

Preferably, a retaining block is fixedly arranged at an end, away from the ejector rod, of the spline shaft.

Compared with the prior art, when the control switch and regulating mechanism for an atomizer provided by the invention are used, the push button is pushed to move towards the press button to start a fan by means of the fan controller, the push button drives the fixed rod on the push button to be located above the clamping groove in the press button, the press button is held to drive the end, away from the regulating mechanism, of the press button to rotate upwards around the rotating rod until the clamping groove in the press button clamps the lower end of the fixed rod, and at this moment, an atomizer starts to spray water; either the push button or the press button is pressed separately, the atomizer will not spray water; the spring applies a force to the fixed rod to drive the fixed rod to move away from the press button until the lower end of the fixed rod is steadily clamped in the clamping groove, and the torsion spring applies a force to the end, away from the regulating mechanism, of the press button to drive said end to rotate downwards around the rotating rod; after users release the press button, the end, away from the regulating mechanism, of the press button will be driven under the action of the torsion spring to rotate downwards around the rotating rod to allow the fixed rod to disengage from the clamping groove, and the fixed rod moves away from the press button along the sliding groove under the action of the spring to control the fan controller to be turned off. In this way, the atomizer can be used easily, and the situation where the atomizer is started due to mistouch of the press button is effectively avoided.

BRIEF DESCRIPTION OF THE DRAWINGS

FIG. 5 is an overall structural view after the control switch is turned on;

Reference signs: 1, housing; 2, press button; 3, water outlet tube; 4, spline shaft; 5, rotating ferrule; 6, guide groove; 7, limiting plate; 8, rotating groove; 9, ejector rod; 10, guide plate; 11, clamping groove; 12, adjusting knob; 13, first gear; 14, second gear; 15, spacing ring; 16, positioning ring; 17, retaining block; 18, control switch; 19, regulating mechanism; 20, push button; 21, sliding groove; 22, rotating rod; 23, fixed rod; 24, clamping groove; 25, fixed pillar; 26, spring; 27, clamping seat; 28, torsion spring; 29, clamping pillar; 30, push block; 31, moving groove; 32, mark.

DETAILED DESCRIPTION OF THE EMBODIMENTS

Figure 1:
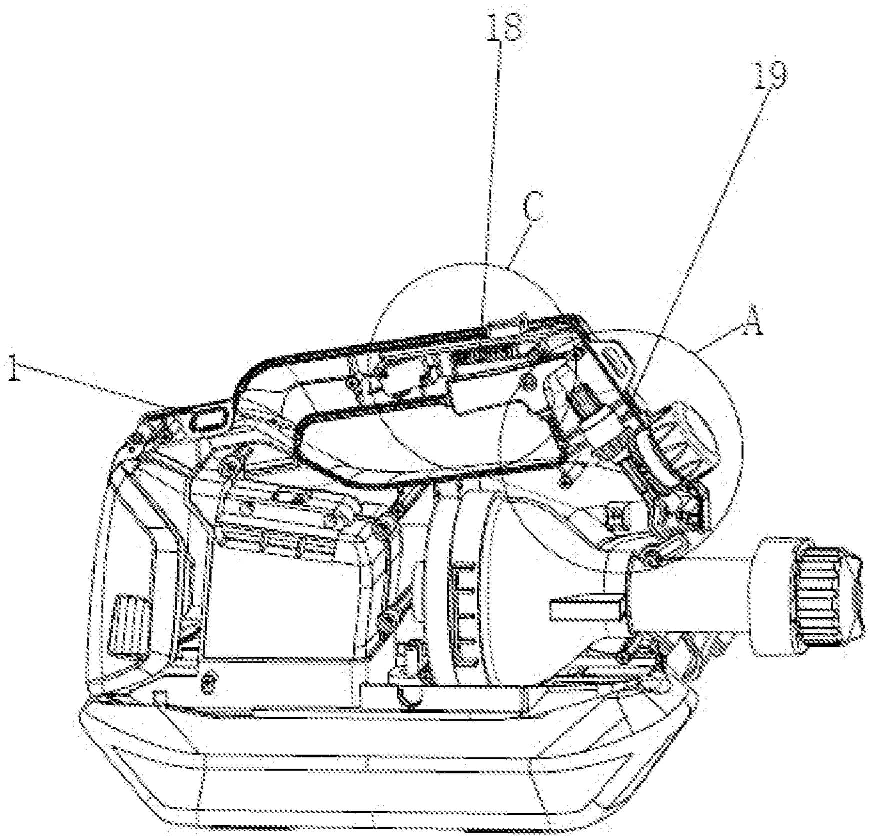
FIG. 1 is an overall structural view of the invention after installation.
Figure 2:
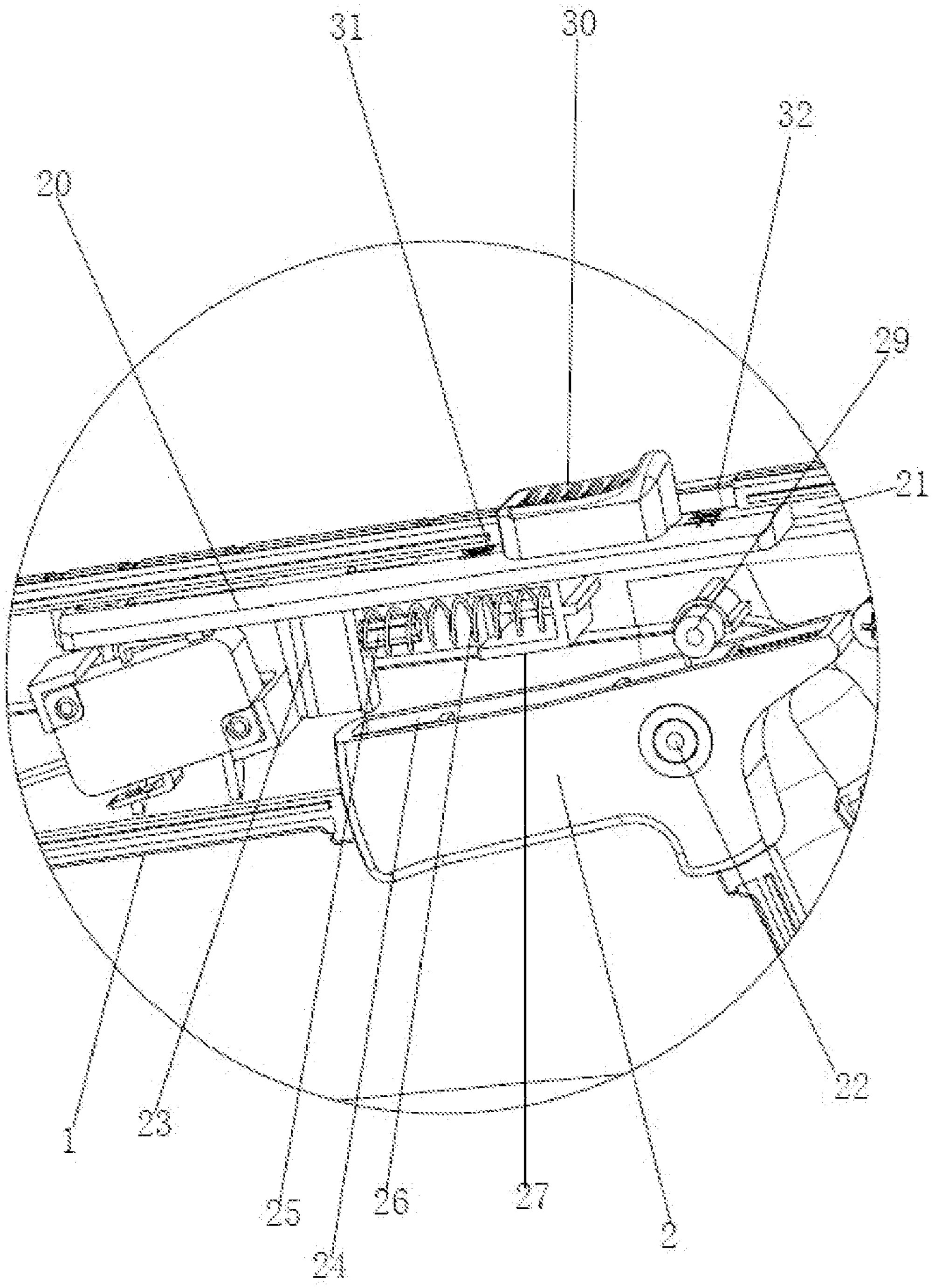
FIG. 2 is an enlarged view of part C in FIG. 1.
Figure 3:
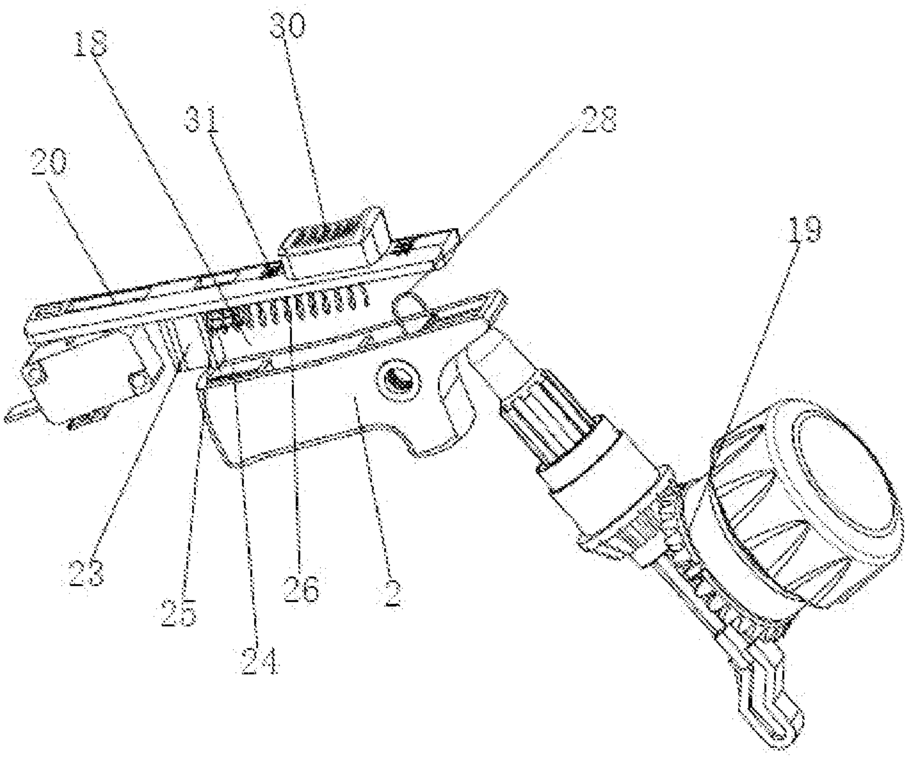
FIG. 3 is an overall structural view of the invention.
Figure 4:
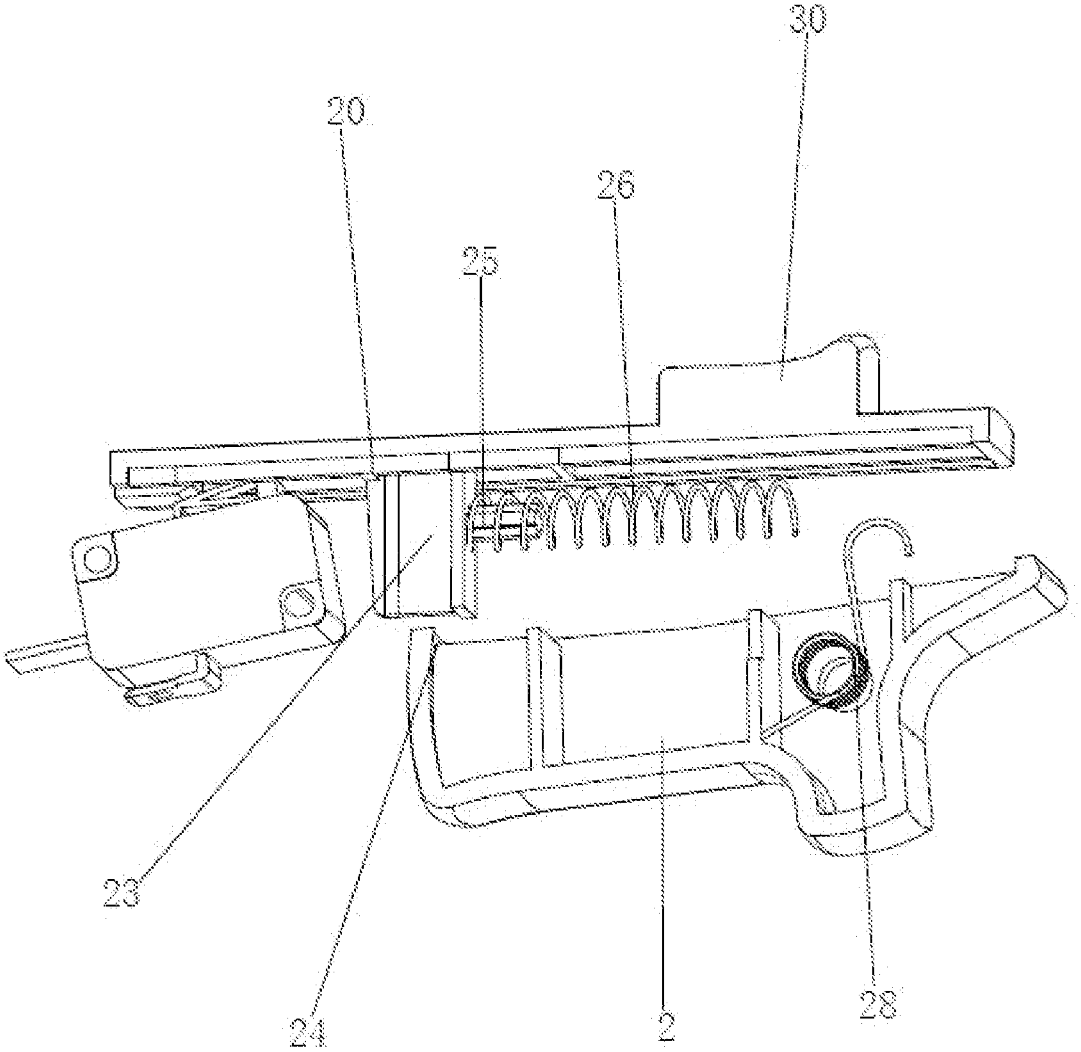
FIG. 4 is a sectional view of a control switch.
Figure 5:
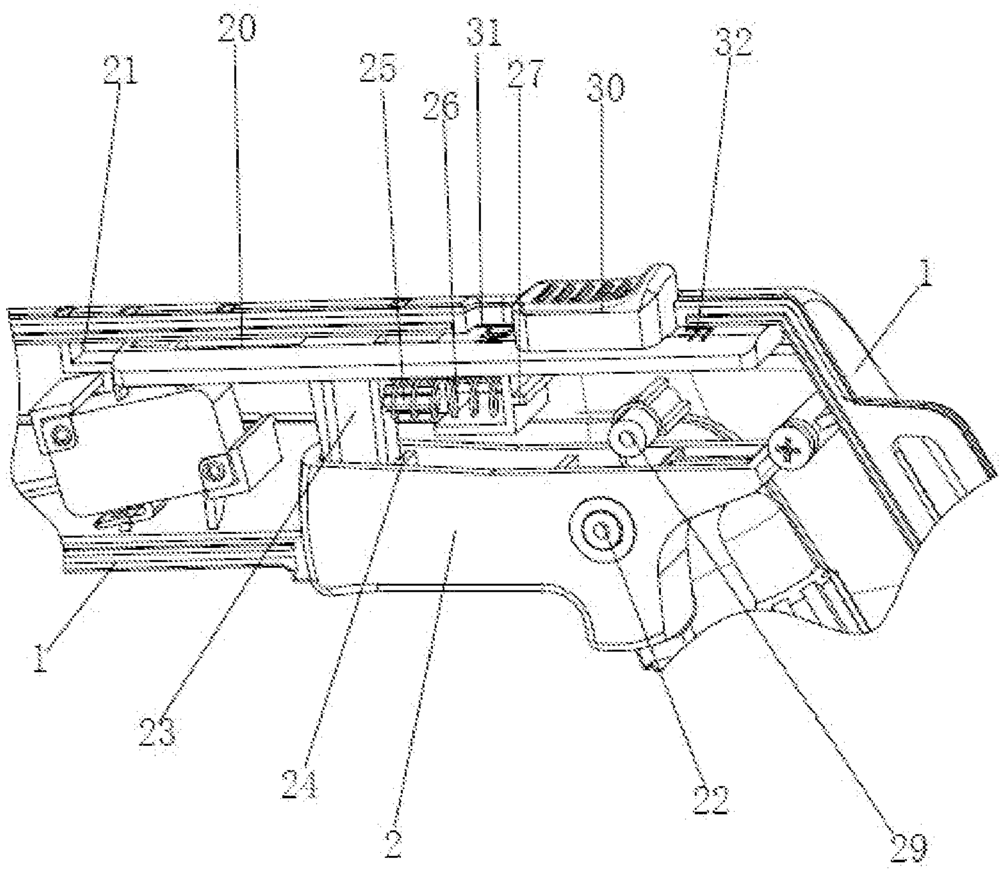

The invention is further described below in conjunction with the embodiments illustrated by the accompanying drawings: as shown in FIGS. 1-5, a control switch 18 and regulating mechanism 19 for an atomizer are mounted in an atomizer housing 1, wherein the control switch 18 is used for controlling a fan controller to be turned on or off, the regulating mechanism 19 is located between the control switch 18 and a water outlet tube, the control switch 18 comprises a push button 20 for controlling the fan controller to be turned on or off and a press button 2 for driving the regulating mechanism 19 to move, a sliding groove 21 used for clamping the push button 20 and allowing the push button 20 to reciprocate in a length direction of the push button 20 is formed in the housing 1, a rotating rod 22 is fixedly arranged in the housing 1, the press button 2 is rotatably arranged on the rotating rod 22, one end of the press button 2 is located below the push button 20, the other end of the press button 2 leans against the regulating mechanism 19, a fixed rod 23 is fixedly arranged at a lower end of the push button 20, a clamping groove 24 for clamping the fixed rod 23 is formed in an upper surface of a side, away from the regulating mechanism 19, of the press button 2, the push button 20 is able to move towards the press button 2 in a length direction of the sliding groove 21 and press the press button 2 to enable the press button 2 to rotate around the rotating rod 22 to allow the clamping groove 24 in the press button 2 to rotate upwards around the rotating rod 22 to clamp the fixed rod 23.

A fixed pillar 25 is fixedly arranged on an end face, facing the press button 2, of the fixed rod 23, the fixed pillar 25 is sleeved with a spring 26 for driving the push button 20 to move away from the press button 2, a clamping seat 27 used for clamping the spring 26 and having an opening facing the fixed rod 23 is fixedly arranged in the housing 1, and an end, away from the fixed pillar 25, of the spring 26 is clamped in the clamping seat 27. The rotating rod 22 is sleeved with a torsion spring 28 for driving an end, away from the regulating mechanism 19, of the press button 2 to rotate downwards around the rotating rod 22, a clamping pillar 29 is fixedly arranged on the housing 1 and located above the press button 2, one end of the torsion spring 28 is clamped on the clamping pillar 29, and the other end of the torsion spring 28 is fixedly arranged on the press button 2.

A push block 30 is fixedly arranged at an upper end of the push button 20, an upper end of the push block 30 is located on an outer side of the housing 1, a moving groove 31 for clamping the push block 30 is formed in the housing 1, and the moving groove 31 is longer than the push block 30. On and off marks 32 are arranged on the push button 20, and the two marks 32 are respectively located on two sides of the push block 30 on the push button 20, located on a same line as the push block 30 and parallel to the length direction of the push button 20. In this way, the operating state of the atomizer can be visually displayed.

In use, the push button 20 is pushed to move towards the press button 2 to start a fan by means of the fan controller, the push button 20 drives the fixed rod 23 on the push button 20 to be located above the clamping groove 24 in the press button 2, the press button 2 is held to drive the end, away from the regulating mechanism 19, of the press button 2 to rotate upwards around the rotating rod 22 until the clamping groove 24 in the press button 2 clamps the lower end of the fixed rod 23, and at this moment, an atomizer starts to spray water; either the push button 20 or the press button 2 is pressed separately, the atomizer will not spray water; the spring 26 applies a force to the fixed rod 23 to drive the fixed rod 23 to move away from the press button 2 until the lower end of the fixed rod 23 is steadily clamped in the clamping groove 24, and the torsion spring 28 applies a force to the end, away from the regulating mechanism 19, of the press button 2 to drive said end to rotate downwards around the rotating rod 22; after users release the press button 2, the end, away from the regulating mechanism 19, of the press button 2 will be driven under the action of the torsion spring 28 to rotate downwards around the rotating rod 22 to allow the fixed rod 23 to disengage from the clamping groove 24, and the fixed rod 23 moves away from the press button 2 along the sliding groove 21 under the action of the spring 26 to control the fan controller to be turned off. In this way, the atomizer can be used easily, and the situation where the atomizer is started due to mistouch of the press button 2 is effectively avoided.

Figure 6:
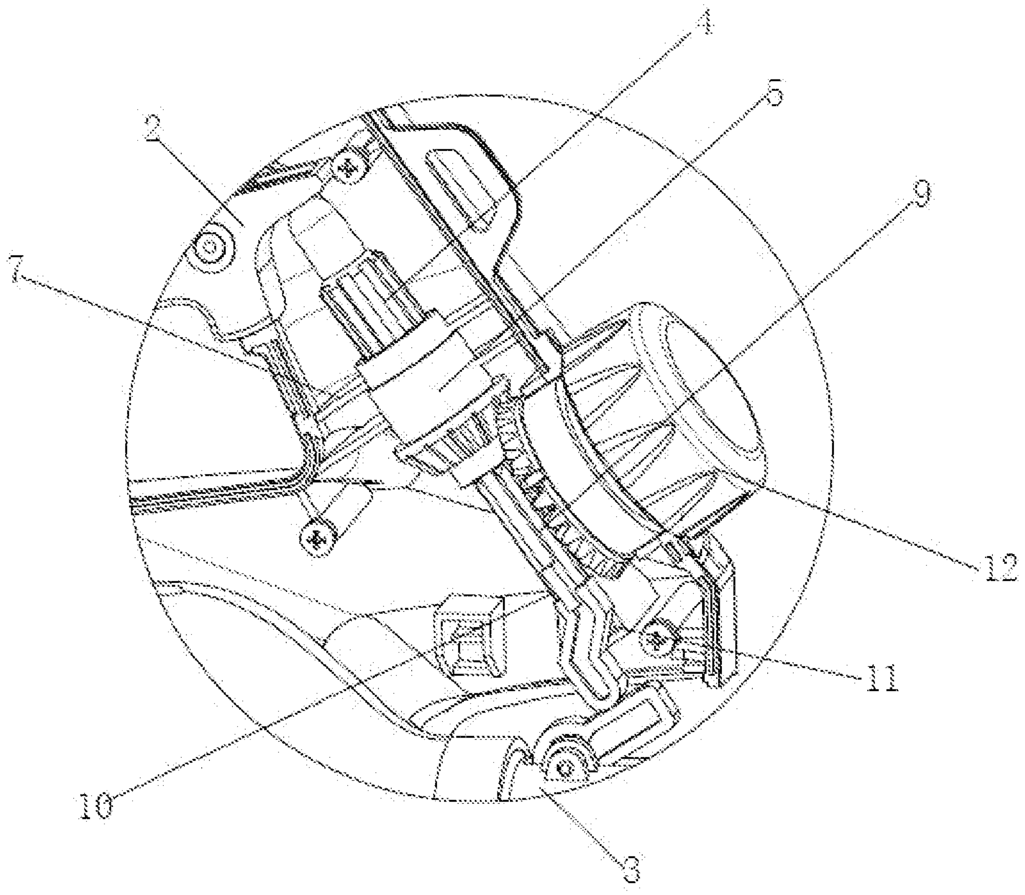
FIG. 6 is an enlarged view of part A in FIG. 1.
Figure 7:
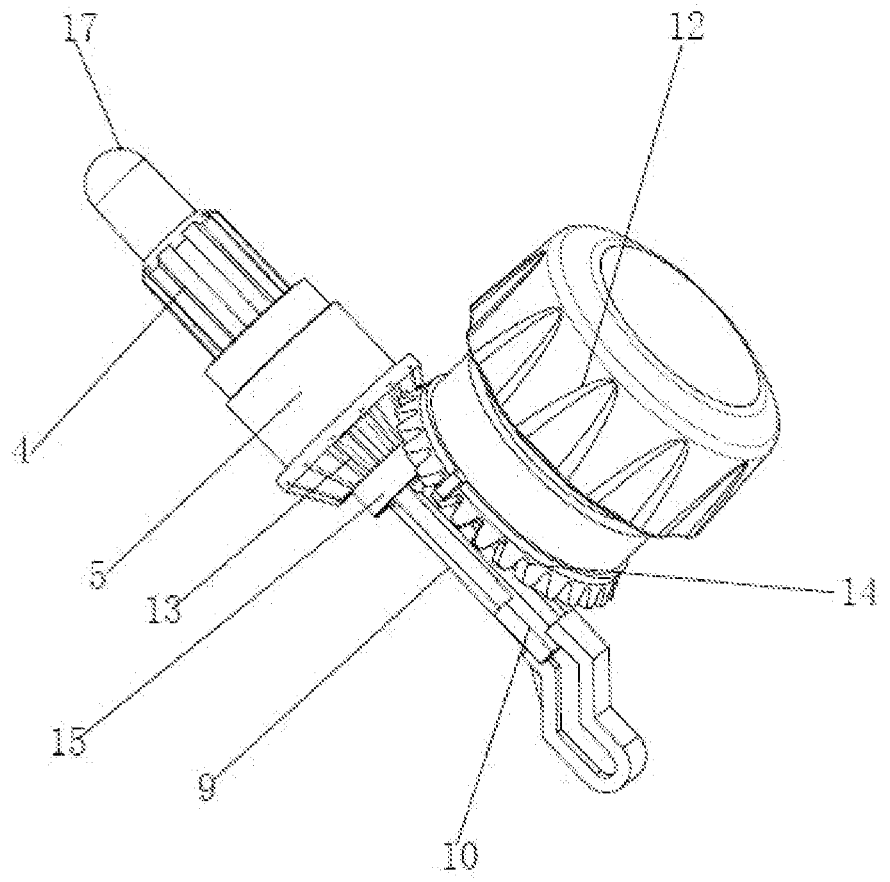
FIG. 7 is an overall structural view of a regulating mechanism.
Figure 8:
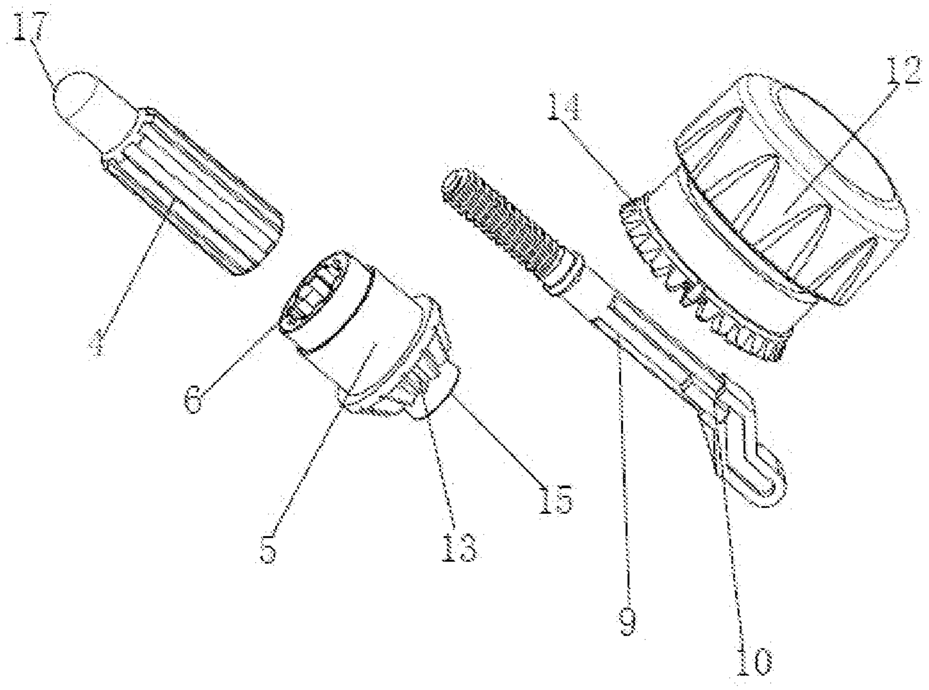
FIG. 8 is an exploded structural view of the regulating mechanism.
Figure 9:
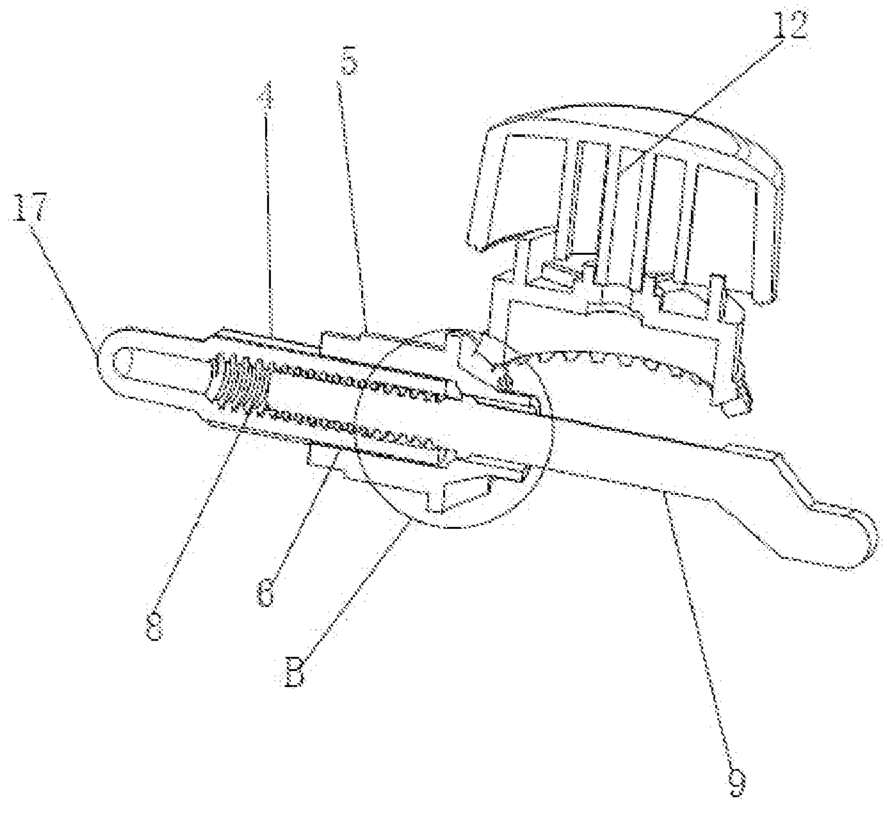
FIG. 9 is a sectional view of the regulating mechanism.
Figure 10:
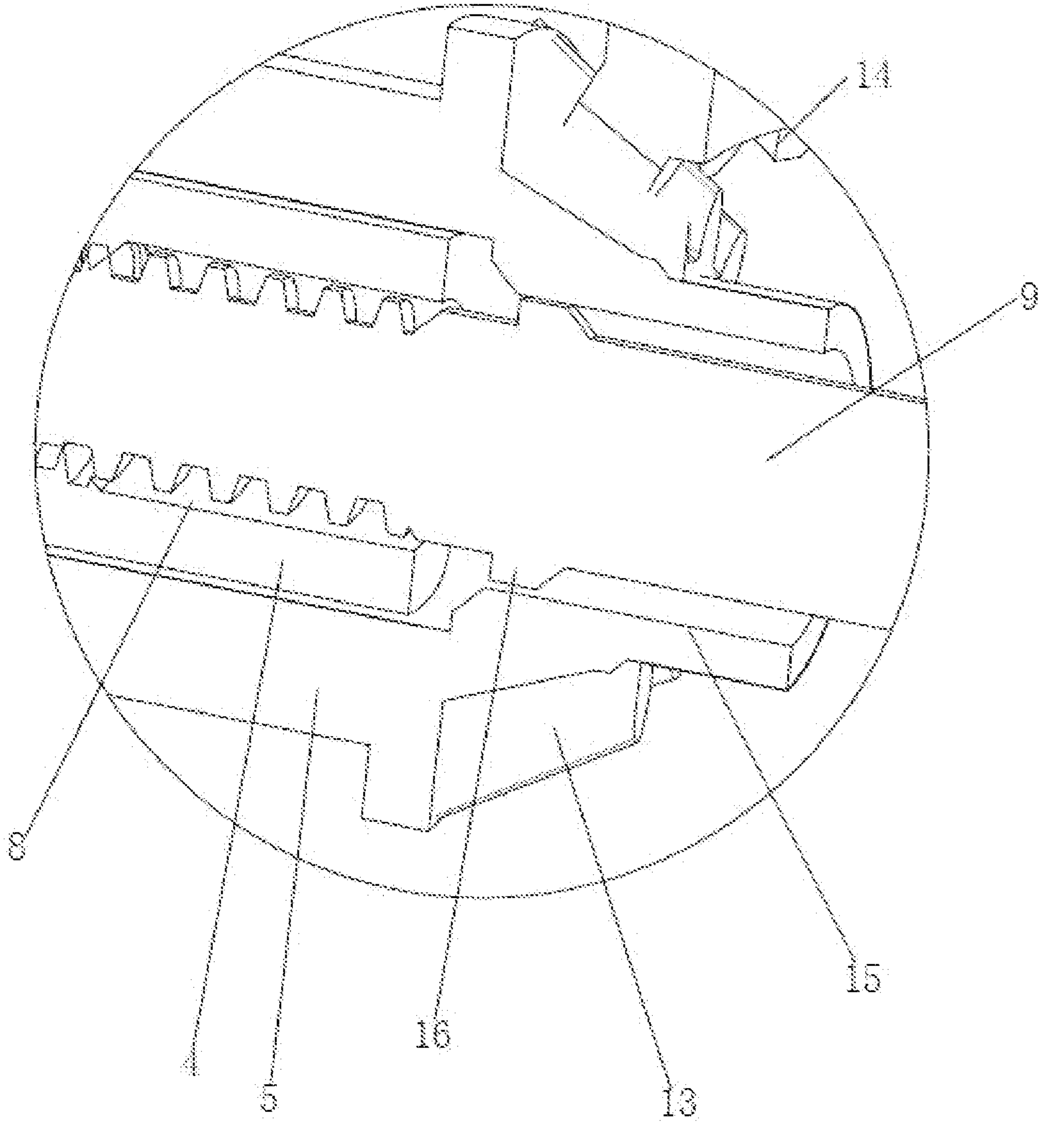
FIG. 10 is an enlarged view of part B in FIG. 9.

As shown in FIGS. 6-10, the regulating mechanism 19 comprises a spline shaft 4 rotatably arranged in the housing 1 and a rotating ferrule 5 disposed around the spline shaft 4 and capable of moving in a length direction of the spline shaft 4, wherein a guide groove 6 matched with the spline shaft 4 is formed in an inner wall of the rotating ferrule 5, a limiting plate 7 used for restraining the rotating ferrule 5 from moving in the length direction of the spline shaft 4 is fixedly arranged on the housing 1, a rotating groove 8 extending into the spline shaft 4 is formed in a lower surface of the spline shaft 4, an ejector rod 9 is movably arranged in the rotating groove 8 by threaded connection, a guide plate 10 is fixedly arranged on each of two sides of the ejector rod 9, clamping grooves 11 for clamping the guide plates 10 are fixedly arranged in the housing 1, the guide plates 10 are able to move in the clamping grooves 11 in a length direction of the ejector rod 9 as the ejector rod 9 moves, and an adjusting knob 12 for controlling the rotating ferrule 5 to rotate is arranged on the housing 1.

The adjusting knob 12 is rotatably arranged on the housing 1, a first gear 13 is fixedly arranged at an end, facing the ejector rod 9, of the rotating ferrule 5, a second gear 14 always meshed with the first gear 13 is fixedly arranged at an end, facing the rotating ferrule 5, of the adjusting knob 12, and the adjusting knob 12 is able to drive the rotating ferrule 5 to rotate around the central axis of the rotating ferule 5 by means of the first gear 13 and the second gear 14 matched with the first gear 13. When rotated, the adjusting knob drives the rotating ferrule 5 disposed around the spline shaft 4 to rotate around the rotation center of the spline shaft 4 by means of the first gear 13 and the second gear 14 always meshed with the first gear 13, the guide plates 10 on the two sides of the ejector rod 9 are clamped in the clamping grooves 11 to restrain the rotation of the ejector rod 9, the ejector rod 9 is driven by the rotating spline shaft 4 threadedly connected to the ejector rod 9 to move in a length direction of the clamping grooves 11 to adjust the overall length of the spline shaft 4 and the ejector rod 9, the press button 2 can be pressed to change the length of the regulating mechanism to adjust the gap between a plug in the water outlet tube 3 and an water outlet so as to regulate the outlet flow rate, the structure is simple, and the outlet flow rate can be regulated easily.

The first gear 13 is a bevel gear, the second gear 14 inclines gradually towards the periphery of the adjusting knob 12 in a direction from the adjusting knob 12 to the rotating ferrule 5, and a length direction of teeth on the second gear 14 is perpendicular to a length direction of teeth on the first gear 13. Because the length direction of the teeth on the second gear 14 is perpendicular to the length direction of the teeth on the first gear 13, the force for rotating the adjusting knob 12 can be completely transferred onto the first gear 13, thus saving labor.

A spacing ring 15 is fixedly arranged at the end, facing the ejector rod 9, of the rotating ferrule 5, the spacing ring 15 is located in the first gear 13 and disposed around the ejector rod 9, an inner diameter of the spacing ring 15 is less than an outer diameter of the spline shaft 4, a positioning ring 16 is fixedly arranged on the ejector rod 9, and the diameter of the positioning ring 16 is greater than the diameter of the ejector rod 9 and less than the inner diameter of the spacing ring 15. When assembled, a lower end of the spline shaft 4 leans against an end face, facing the spline shaft 4, of the spacing ring 15, and the ejector rod 9 is assembled in the spline shaft 4 by threaded connection until the positioning ring 16 leans against the end face, facing the ejector rod 9, of the spline shaft 4. By limiting the assembly position of the ejector rod 9 by means of the positioning ring 16, accurate positioning can be realized during installation.

A retaining block 17 is fixedly arranged at an end, away from the ejector rod 9, of the spline shaft 4. The retaining block 17 is a spherical retaining block 17. When the press button 2 of the atomizer is pressed, the spline shaft 4 is driven to move, the press button 2 always leans against the retaining block 17 and keeps rotating when pressed, and the end face of the press button 2 always leans against the retaining block 17, such that the press button will not get stuck in the pressing process and can be pressed more smoothly.

The specific embodiments described in the specification are merely used for describing the spirit of the invention by way of examples. Those skilled in the art can make various amendments, supplements or similar substitutions to the specific embodiments described above without deviating from the spirit of the invention or exceeding the scope defined by the appended claims.

What is claimed is:

1. A control switch and a regulating mechanism for an atomizer, being mounted in an atomizer housing, the control switch being used for controlling a fan controller to be turned on or off, and the regulating mechanism being located between the control switch and a water outlet tube, wherein the control switch comprises a push button for controlling the fan controller to be turned on or off and a press button used for driving the regulating mechanism to move and rotatably arranged in the atomizer housing, the press button has a first end located below the push button and a second end leaning against the regulating mechanism, a fixed rod is fixedly arranged at a lower end of the push button, a clamping groove for clamping the fixed rod is formed in an upper surface of a side, away from the regulating mechanism, of the press button, and the push button is configured to move towards the press button in a length direction of the push button and press the press button to allow the clamping groove in the press button to rotate to clamp the fixed rod.

2. The control switch and the regulating mechanism for the atomizer according to claim 1, wherein a sliding groove used for clamping the push button and allowing the push button to reciprocate in the length direction of the push button is formed in the atomizer housing, a rotating rod is fixedly arranged in the atomizer housing, and the press button is rotatably arranged on the rotating rod.

3. The control switch and the regulating mechanism for the atomizer according to claim 1, wherein a fixed pillar is fixedly arranged on an end face, facing the press button, of the fixed rod, the fixed pillar is sleeved with a spring for driving the push button to move away from the press button, a clamping seat used for clamping the spring and having an opening facing the fixed rod is fixedly arranged in the atomizer housing, and an end, away from the fixed pillar, of the spring is clamped in the clamping seat.

4. The control switch and the regulating mechanism for the atomizer according to claim 2, wherein the rotating rod is sleeved with a torsion spring for driving an end, away from the regulating mechanism, of the press button to rotate downwards around the rotating rod, a clamping pillar is fixedly arranged on the atomizer housing and located above the press button, and the torsion spring has a first end clamped on the clamping pillar and a second end fixedly arranged on the press button.

5. The control switch and the regulating mechanism for the atomizer according to claim 4, wherein a push block is fixedly arranged at an upper end of the push button, an upper end of the push block is located on an outer side of the atomizer housing, a moving groove for clamping the push block is formed in the atomizer housing, and the moving groove is longer than the push block.

6. The control switch and the regulating mechanism for the atomizer according to claim 1, wherein on and off marks are arranged on the push button-, and the on and off marks are respectively located on two sides of a push block on the push button, located on a same line as the push block and parallel to the length direction of the push button.

7. The control switch and the regulating mechanism for the atomizer according to claim 1, wherein the regulating mechanism comprises a spline shaft rotatably arranged in the atomizer housing and a rotating ferrule disposed around the spline shaft and configured for moving in a length direction of the spline shaft-, a guide groove matched with the spline shaft is formed in an inner wall of the rotating ferrule, a limiting plate used for restraining the rotating ferrule from moving in the length direction of the spline shaft is fixedly arranged on the atomizer housing, a rotating groove extending into the spline shaft is formed in a lower surface of the spline shaft, an ejector rod is movably arranged in the rotating groove by a threaded connection, guide plates are fixedly arranged on two sides of the ejector rod, clamping grooves for clamping the guide plates are fixedly arranged in the atomizer housing, the guide plates are configured to move in the clamping grooves in a length direction of the ejector rod as the ejector rod moves, and an adjusting knob for controlling the rotating ferrule to rotate is arranged on the atomizer housing.

8. The control switch and the regulating mechanism for the atomizer according to claim 7, wherein the adjusting knob is rotatably arranged on the atomizer housing, a first gear is fixedly arranged at an end, facing the ejector rod, of the rotating ferrule, a second gear always meshed with the first gear is fixedly arranged at an end, facing the rotating ferrule, of the adjusting knob, and the adjusting knob is configured able to drive the rotating ferrule to rotate around a central axis of the rotating ferule by the first gear and the second gear matched with the first gear.

9. The control switch and the regulating mechanism for the atomizer according to claim 8, wherein the first gear is a bevel gear, the second gear inclines gradually towards a periphery of the adjusting knob in a direction from the adjusting knob to the rotating ferrule, and a length direction of teeth on the second gear is perpendicular to a length direction of teeth on the first gear.

10. The control switch and the regulating mechanism for the atomizer according to claim 9, wherein a spacing ring is fixedly arranged at the end, facing the ejector rod, of the rotating ferrule, the spacing ring is located in the first gear and disposed around the ejector rod, an inner diameter of the spacing ring is less than an outer diameter of the spline shaft, a positioning ring is fixedly arranged on the ejector rod, and a diameter of the positioning ring is greater than a diameter of the ejector rod and less than the inner diameter of the spacing ring.

* * * * *